Aug. 16, 1949.  W. F. DOUBLE  2,479,327
TANDEM BOGIE ASSEMBLY
Filed Sept. 28, 1945  3 Sheets-Sheet 1

INVENTOR
WALTER F. DOUBLE
By Hyde and Meyer
ATTORNEYS

Aug. 16, 1949.  W. F. DOUBLE  2,479,327
TANDEM BOGIE ASSEMBLY
Filed Sept. 28, 1945  3 Sheets-Sheet 2

INVENTOR
WALTER F. DOUBLE
BY Hyde and Meyer
ATTORNEYS

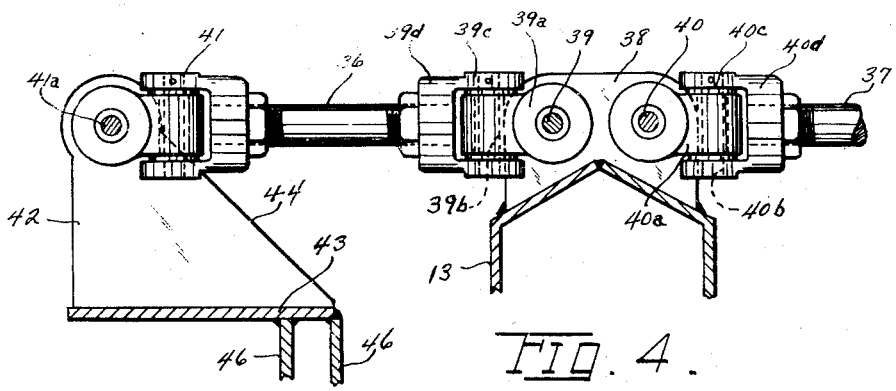
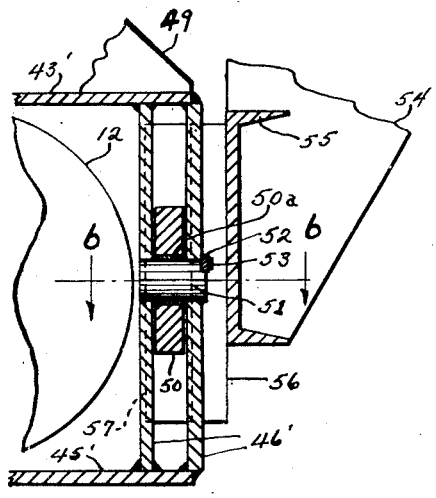
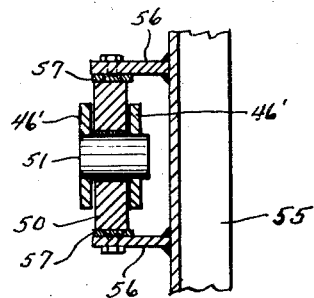
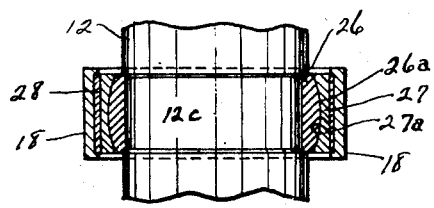
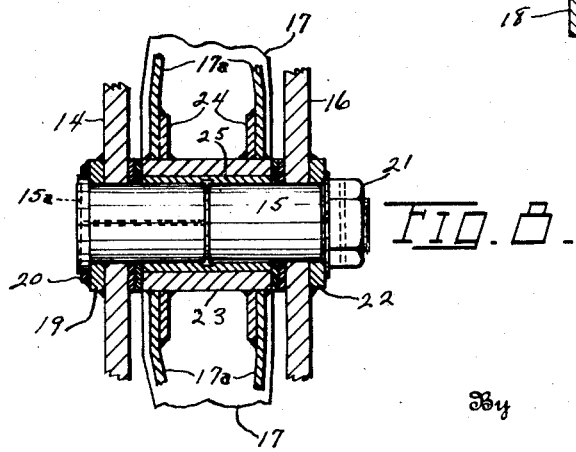

Patented Aug. 16, 1949

2,479,327

UNITED STATES PATENT OFFICE 2,479,327

TANDEM BOGIE ASSEMBLY

Walter F. Double, Willoughby, Ohio, assignor to The Euclid Road Machinery Co., Euclid, Ohio, a corporation of Ohio Application September 28, 1945, Serial No. 619,126

7 Claims. (Cl. 180—22)

This invention relates to improvements in a tandem bogie wheel assembly.

An object of the present invention is to provide a simple rugged construction adapted to carry heavy loads over rough ground. The device does away with all springs, is composed of a few strongly built parts and provides for all of the necessary axle movements encountered in off-the-highway driving.

In the accompanying drawings and description the parts are described together with their functions and the new and improved construction will be summarized in the appended claims.

In the drawings,

Fig. 4 is an enlarged fragmental sectional view taken along the line 4—4 of Fig. 1;

Fig. 5 is an enlarged fragmental sectional view taken along the line 5—5 of Fig. 3;

Fig. 6 is a sectional view taken along the line 6—6 of Fig. 5;

Fig. 7 is an enlarged fragmental sectional view taken along the line 7—7 of Fig. 2; while Fig. 8 is an enlarged fragmental sectional view taken along the line 8—8 of Fig. 2.

Figure 1:
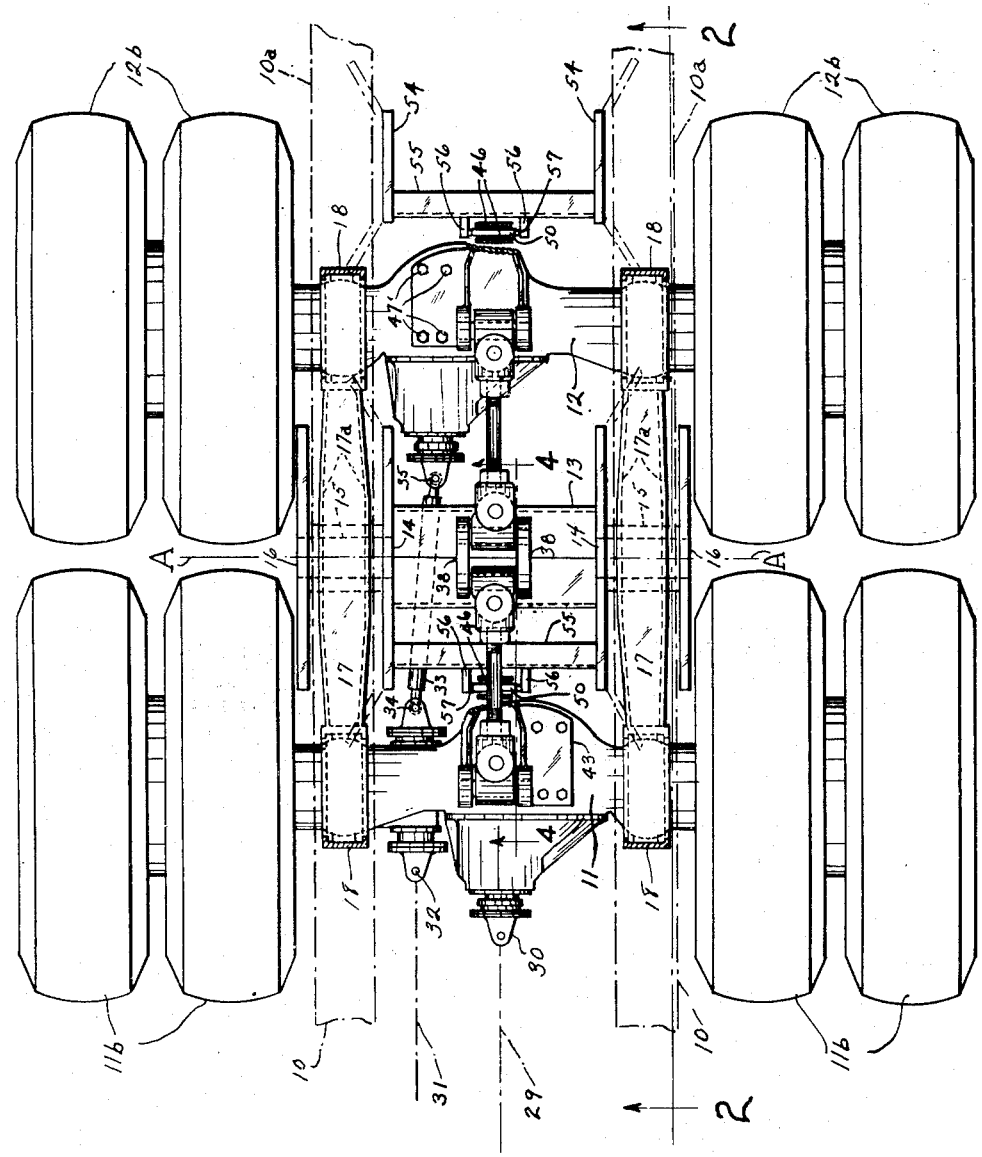
Fig. 1 is a top plan view of my improved assembly as a whole, the main frame members of the vehicle being indicated in dot-dash lines to show their relative position.

My device is adapted for use in those vehicles carrying such heavy loads that a plurality of axles and a number of wheels must be used to properly distribute the load. As shown in the various views the frame or chassis of the vehicle is indicated at 10 and comprises two parallel I-beams 10a and certain cross beams as will presently appear. A forward axle 11a and a rearward axle 12a are provided in the respective housings 11 and 12. The axle 11a is drivingly connected with the wheels 11b on opposite sides of the vehicle. In like manner the axle 12a is drivingly connected with the wheels 12b.

Figure 2:
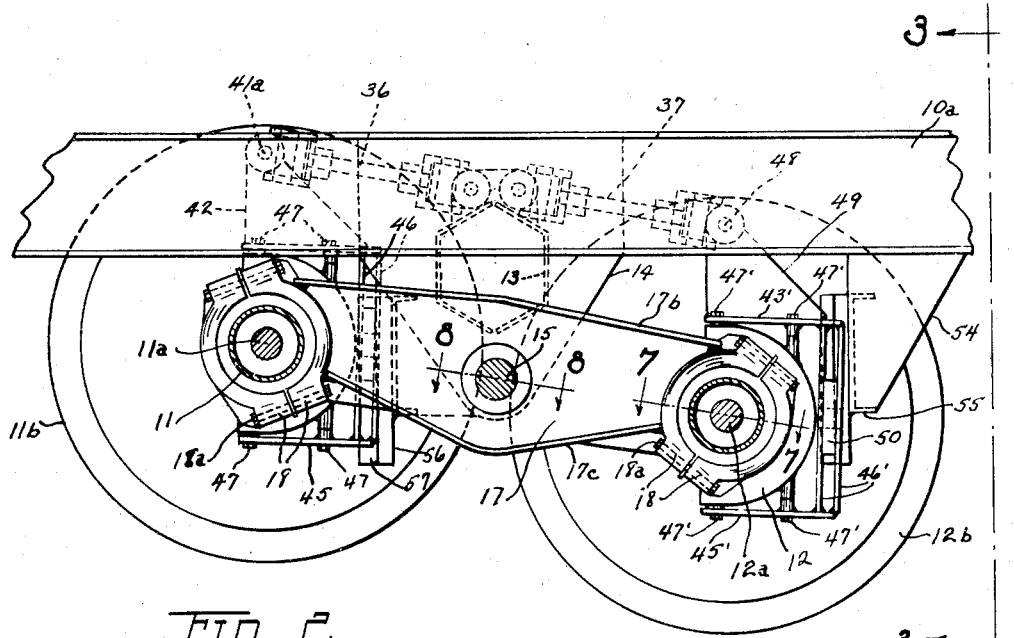
Fig. 2 is a sectional view taken along the line 2—2 of Fig. 1.

Intermediate the forward and rearward axles a cross beam 13 is provided hexagonal in section and rigidly connected as by welding to vertically extending plates 14 welded to the inside edges of the I-beams 10a. Trunnion pins 15 extend laterally outwardly from the plates 14, the outer ends of these pins being supported in vertical plates 16 which are rigidly connected to the outsides of the beams 10a as by welding. On each of the pins 15 is oscillatably mounted a rocker beam 17 and since these rocker beams are alike except for being right- and left-hand, therefore one only will be described. Referring to Figs. 1 and 2, each rocker beam comprises spaced side walls 17a, a top wall 17b, and a bottom wall 17c. These parts as shown are plate members rigidly connected as by welding and the beam may be provided with internal reinforcing members (not shown) as desired. At their front and rear ends each beam 17 is provided with a split bearing 18, as will presently be described.

Referring now to Fig. 8, the mounting of each beam 17 on its associated trunnion pin 15 will be described. The pin 15 has an enlarged inner head 15a which engages against the ring 19 which in turn is welded to the plate 14. Stop members 20 welded to the ring 19 engage flat sides of the head 15a to keep the pin 15 from turning. On its outer end the pin 15 is threaded to receive a castellated nut 21 which is screwed down into engagement with the ring 22 which in turn is welded to the plate 16. Between the side walls 17a of the beam 17 is welded a sleeve 23 supported at each end against a reinforcing plate 24. This sleeve is spaced slightly from the pin 15 to provide for a bushing 25. This provides an oscillatable mounting of beam 17 on the pin 15. The beams 17 oscillate about the common axis A (Fig. 1).

Figure 3:
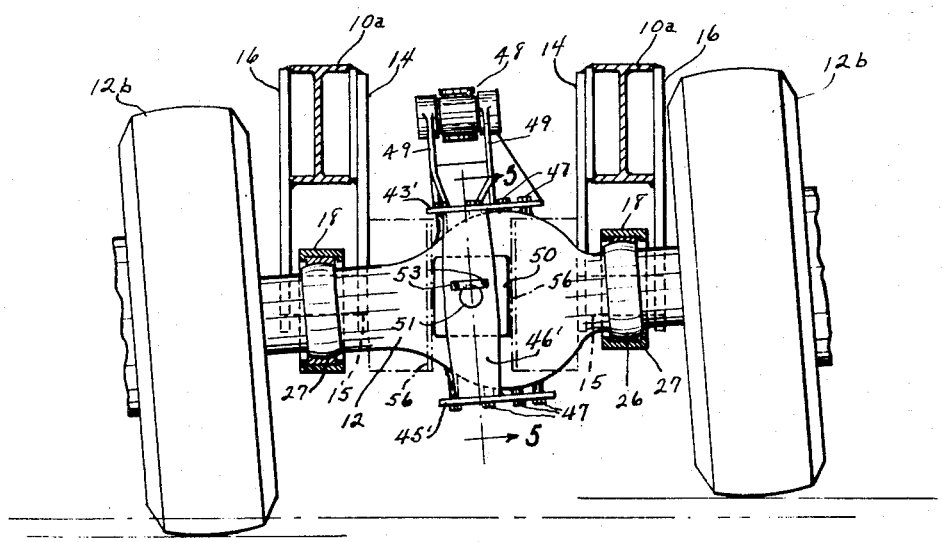
Fig. 3 is a rear elevational view taken generally in the position of the line 3—3 of Fig. 2 and with certain of the parts shown in section to more clearly illustrate the construction.

The mounting of the axle housings 11 and 12 in the bearings 18 is clearly shown in Figs. 2, 3 and 7. Since all of these are alike, one only, connected with housing 12, will be described in detail. In the axle housing is provided a groove of reduced diameter at 12c into which are fitted two semi-cylindrical halves of a bushing 26. The outer face of this bushing at 26a is spherical and coacts with the inner spherical face 27a of the bushing 27. This bushing is also split along diametrical lines. Radially outside of the bushing 27 is the plain bushing 28 also split on a diameter. These bushings are all held in place by the bearing caps 18 previously mentioned and held together by the bolts 18a. It results from this construction, as illustrated in Fig. 3 that either of the axle housings 11 or 12 may tilt laterally as shown, because of the relative oscillation permitted between the bushings 26 and 27 (the bushing details of Fig. 7 have been omitted from Fig. 3 for clearness). Obviously the bushing arrangement also permits a slight rotation of the axle housing in the bearing caps 18 about the axle as a center. My improved construction permits the tilting of axle 12 in a counter-clockwise direction as viewed from the rear in Fig. 3 while at the same time the axle housing 11 may tilt in a similar manner either in the same direction or in a clockwise direction.

Referring to Fig. 1, drive means for axle 11a is provided by a shaft not shown, lying along the center line 29 and provided with a universal joint at the point 30. This is a conventional drive shaft connection and therefore no details are necessary. The drive for axle 12a is by means of a shaft not shown, lying on the center line 31 and having a universal joint connection at the point 32. This drive means passes through means carried by the housing 11 and then through shaft 33 provided with universal joint connections at 34 and 35 in the usual manner.

Means is provided to resist the torque set up by the wheel driving mechanism. This means comprises a single pair of torque arms 36 and 37 connected at one end to the beam 13 directly above the axis of the trunnion pins 15. The forward end of arm 36 is connected to housing 11 and the rearward end of arm 37 is connected to housing 12.

The central connections of the torque arms, as clearly seen in Figs. 1 and 4, comprise a pair of parallel upstanding vertical plates 38 welded to beam 13 and supporting horizontally extending pivot pins 39 and 40. Oscillatably mounted on pin 39 is a member 39a provided with an opening 39b through which passes a vertically extending pin 39c which in turn is mounted in the clevis 39d carried on the end of arm 36. This provides a universal joint action at this point. In a similar manner the parts 40a, 40b, 40c and 40d provide a similar universal joint for arm 37. Referring now to the outer end of arm 36, a universal joint 41 like that just described, connects the arm to a bracket 42 which in turn is rigidly connected with the housing 11. This bracket comprises a horizontal plate 43 carrying the upstanding parallel plates 44 which in turn support the pin 41a of the universal joint connection. The plate 43 lies above the axle housing 11. A similar plate 45 rests below the axle housing and these two plates are rigidly connected together by the parallel vertically extending plates 46 which are welded to plates 43 and 45. The connection of plates 43 and 45 to the housing 11 is by means of the bolts 47 indicated. In a similar manner the rear end of arm 37 is provided with a universal joint connection at 48 with a bracket 49 which is in all respects similar to the bracket just described and is rigidly connected with the housing 12.

Means is provided to absorb the lateral thrust of the housings 11 and 12 so that these housings cannot move laterally relative to the vehicle frame 10.

This means is exactly the same for the forward and rearward axles except that one bracket is right-hand and the other left-hand, and therefore one only will be described. Mounted substantially in the middle of the rear axle housing 12 is the bracket 49 which supports the universal joint connection 48 previously mentioned. This is similar to the bracket mounted on axle housing 11 and therefore the top plate of the bracket has been marked 43', the bottom plate 45' and the two parallel vertical plates connecting these two are marked 46'. All of these plates are welded to form a rigid bracket which is secured to the axle housing by the bolts 47'. Mounted between the plates 46' is a thrust block 50 which might be a roller, but in the present case is substantially square in rear elevation as viewed in Fig. 3. The details of the mounting of this block should be apparent from a study of Figs. 2, 3, 5 and 6. A short pin or shaft 51 is rigidly mounted on the axle housing 12, being carried by the plates 46'. The block 50 is mounted on this pin with a suitable bushing 50a. The block lies between the parallel plates 46' as shown in Figs. 2 and 5. The pin 51 is held in place by the small plate 52 which engages a shoulder in the end of the pin. The plate 52 is secured to the plate 46' by means of cap screws 53. To receive the side thrust from block 50, members are provided rigid with the frame 10 of the vehicle as shown in the drawings. Brackets 54 rigidly connected with the side frame members 10a are connected by a cross frame member 55 which is here shown as a channel having its flanges facing rearwardly. Rigidly mounted on this channel are parallel guides 56 each of which carries a vertical hardened steel wear plate 57 adapted to engage the thrust block 50. The position of these guides 56, 57 is shown schematically in Fig. 3 in dot-dash lines.

It results from the above described construction that the block 50 has its center fixed with respect to the associated axle housing, but the housing is adapted to tilt on rough ground as shown in Fig. 3, while the side edges of block 50 remain in vertical position coacting with the vertical guides 56 which are rigidly mounted on the truck frame. Thus, all of the side thrust from the axle housing is taken directly on the vehicle frame and none of it is carried by the rocking beams 17.

The bracket connected with the axle housing 11 is exactly like that just described in connection with housing 12, except that one is right-hand and the other left-hand, therefore, the parts have been given the same reference characters, and the block 50 coacts in the same way with parallel vertical guides 56 which are rigidly connected with another cross frame member 55 shown to the rear of the housing 11.

I have thus provided a very simple, strong tandem bogie construction adapted to withstand rough usage over rough ground. All of the parts are arranged to accommodate themselves to any unevenness of ground which is encountered in practice. As best seen in Fig. 2, on each side of the vehicle the rocker beam 17 forms the lower side of a parallelogram, the upper side of which is formed by the torque arms 36 and 37. This parallelogram extends from 41a to 11a to 12a to 48 and back to 41a. The parallelogram can assume any position necessary to permit the rocking of beam 17.

What I claim is:

1. Tandem bogie construction comprising a frame, parallel rigid rocker beams mounted on said frame for oscillation about a common axis, said beams extending in a fore-and-aft direction, parallel forward and rearward axle housings mounted respectively in the front and rear ends of said beams, axles in said housings, drive means for said axles, wheels mounted at each end of each axle and driven by the associated axle, torque arms restraining oscillation of said housings, and side thrust resisting means between each of said housings and said frame, each of said means comprising coacting members connected respectively with said frame and said housing, one of said members being a vertical guide and the other of said members adapted to travel along said guide.

2. The combination of claim 1 wherein said mounting of said housings in said beams includes parts permitting tilting of each of said housings in a plane transverse to said beams.

3. Tandem bogie construction comprising a frame, parallel rocker beams mounted on said frame for oscillation about a common axis, said beams extending in a fore-and-aft direction, parallel forward and rearward axle housings mounted respectively in the front and rear ends of said beams, axles in said housings, drive means for said axles, wheels mounted at each end of each axle and driven by the associated axle, torque arms restraining oscillation of said housings, and side thrust resisting means between each of said housings and said frame, each of said means comprising coacting members connected respectively with said frame and said housing, one of said members being a flat vertical guide and the other of said members having a flat surface adapted to slidingly engage said guide.

4. Tandem bogie construction comprising a frame, parallel rocker beams mounted on said frame for oscillation about a common axis, said beams extending in a fore-and-aft direction, parallel forward and rearward axle housings mounted respectively in the front and rear ends of said beams, axles in said housings, drive means for said axles, wheels mounted at each end of each axle and driven by the associated axle, torque arms restraining oscillation of said housings, and side thrust resisting means between each of said housings and said frame, each of said means comprising coacting members connected respectively with said frame and said housing, one of said members comprising parallel vertical guides and the other of said members being a block having sides slidingly engaging said guides, said block oscillatably mounted on a pivot extending in a fore-and-aft direction.

5. Tandem bogie construction comprising a frame, parallel rigid rocker beams mounted on said frame for oscillation about a common axis, said beams extending in a fore-and-aft direction, parallel forward and rearward axle housings mounted respectively in the front and rear ends of said beams, axles in said housings, said common axis lying substantially in a plane determined by the axes of said axles, drive means for said axles, wheels mounted at each end of each axle and driven by the associated axle, a bracket rigidly mounted on each of said housings, torque arms pivotally connected to said frame substantially vertically above said axis and extending forwardly and rearwardly therefrom, the other ends of said arms being pivotally connected with said brackets respectively at distances above said axles substantially equal to the distance of said first named pivotal connection above said axis, vertically extending guide means carried by said frame adjacent each housing, and a member carried by each bracket adapted to coact with its associated guide means.

6. Tandem bogie construction comprising vehicle frame means, a plurality of parallel axle means extending transversely of said vehicle frame, traction devices carried by said axle means and supporting said frame means, said axle means being mounted on said frame means for up-and-down movement relative to each other, and a construction for resisting movement of said axle means transversely of said vehicle frame comprising a vertical guide on one of said means and a member adapted to travel along said guide on the other of said means.

7. Tandem bogie construction comprising a frame, parallel rocker beams mounted on said frame for oscillation about a common axis, said beams extending in a fore-and-aft direction, parallel forward and rearward axle housings mounted respectively in the front and rear ends of said beams, axles in said housings, wheel means driven by said axles, said mounting of said housings in said beams comprising coacting surfaces curved to permit tilting of each of said housings in a plane transverse to said beams, means coacting between each of said housings and said frame for withstanding lateral thrust of said housings, and said means including vertically extending guide means on said frame and a thrust member carried by the associated housing.

WALTER F. DOUBLE.

REFERENCES CITED

The following references are of record in the file of this patent:

UNITED STATES PATENTS

| Number | Name | Date |
| --- | --- | --- |
| 1,811,837 | Alden | June 30, 1931 |
| 2,381,624 | Simonds | Aug. 7, 1945 |

FOREIGN PATENTS

| Number | Country | Date |
| --- | --- | --- |
| 151,921 | Great Britain | Jan. 12, 1922 |